United States Patent [19]

Akao

[11] Patent Number: 5,026,594
[45] Date of Patent: Jun. 25, 1991

[54] PACKAGING MATERIAL FOR PHOTOSENSITIVE MATERIALS

[75] Inventor: Mutsuo Akao, Kanagawa, Japan

[73] Assignee: Fuji Photo Film Co., Ltd., Minami-Ashigara, Japan

[21] Appl. No.: 311,974

[22] Filed: Feb. 17, 1989

[30] Foreign Application Priority Data

Feb. 18, 1988 [JP] Japan ................. 63-034022
Apr. 20, 1988 [JP] Japan ................. 63-95677

[51] Int. Cl.$^5$ ........................... B32B 7/02
[52] U.S. Cl. ................. 428/220; 428/34.6; 428/516
[58] Field of Search ............ 428/500, 516, 220, 34.6

[56] References Cited

U.S. PATENT DOCUMENTS

| | | | |
|---|---|---|---|
| 4,147,291 | 4/1979 | Akao et al. | 229/55 |
| 4,258,848 | 3/1981 | Akao et al. | 206/524.2 |
| 4,331,725 | 5/1982 | Akao | 428/138 |
| 4,337,285 | 6/1982 | Akao et al. | 428/461 |
| 4,356,224 | 10/1982 | Akao et al. | 428/220 |
| 4,359,499 | 11/1982 | Akao et al. | 428/201 |
| 4,386,124 | 5/1983 | Akao | 428/335 |
| 4,411,943 | 10/1983 | Akao | 422/161 |
| 4,411,945 | 10/1983 | Akao et al. | 428/216 |
| 4,436,809 | 3/1984 | Akao et al. | 430/501 |
| 4,452,846 | 6/1984 | Akao | 428/220 |
| 4,469,741 | 9/1984 | Akao | 428/461 |
| 4,513,050 | 4/1985 | Akao | 428/200 |
| 4,565,733 | 1/1986 | Akao | 428/215 |
| 4,565,743 | 1/1986 | Akao | 428/522 |
| 4,576,865 | 3/1986 | Akao | 428/355 |
| 4,579,781 | 4/1986 | Akao | 428/461 |
| 4,584,234 | 4/1986 | Hirose et al. | 428/323 |
| 4,587,175 | 5/1986 | Akao | 428/496 |
| 4,629,640 | 12/1986 | Akao | 428/216 |
| 4,639,386 | 1/1987 | Akao | 206/316 |
| 4,653,640 | 3/1987 | Akao | 206/455 |
| 4,661,395 | 4/1987 | Akao | 428/461 |
| 4,661,401 | 4/1987 | Akao | 428/215 |
| 4,663,218 | 5/1987 | Akao | 428/212 |
| 4,687,692 | 8/1987 | Akao | 428/220 |
| 4,708,896 | 11/1987 | Akao | 428/349 |
| 4,730,778 | 3/1988 | Akao et al. | 242/68.7 |
| 4,778,712 | 10/1988 | Akao | 428/213 |
| 4,778,713 | 10/1988 | Akao | 428/215 |
| 4,784,906 | 11/1988 | Akao | 428/324 |
| 4,787,506 | 11/1988 | Akao | 206/395 |
| 4,796,823 | 1/1989 | Akao et al. | |

Primary Examiner—Edith Buffalow
Attorney, Agent, or Firm—Burns, Doane, Swecker & Mathis

[57] ABSTRACT

Two packaging materials for photosensitive materials characterized by utilizing linear low density polyethylene (L-LDPE) resin having a specific character.

One packaging material is a thick coextruded multilayer film comprising an L-DLPE resin film layer mainly composed of an L-LDPE resin specified by the density and the melt index (MI) and a polyethylene resin film layer blended with a medium or high density polyethylene resin having a high MFR, Melt fracture and blocking do not occur, and the film is excellent in flexibility, in spite of being a thick film.

The other packaging material is a single layer film of a light-shielding L-LDPE resin film layer characterized by the combination of two kinds of L-LDPE resin. The packaging material is excellent in all physical strength, particularly tear strength and impact puncture strength, antiblocking property, antistatic properties, heat sealing properties and bag-making ability. The generations of lumps and fish eyes are rare, and the film moldabily is excellent.

6 Claims, 2 Drawing Sheets

PACKAGING MATERIAL FOR PHOTOSENSITIVE MATERIALS

BACKGROUND OF THE INVENTION

1. Field of the Invention

This invention relates to a packaging material particularly suitable for packaging various photographic photosensitive materials such as X-ray film, lithfilm, sheet film, various photographic papers, presensitized plates and photosensitive resin film.

2. Description of the Prior Art

In general, the packaging materials for products of high technology such as photographic photosensitive materials are required to satisfy various properties such as gas barrier, moistureproofness, physical strength such as breaking strength, tear strength, impact puncture strength, Gelbo test strength and wear resistance, heat sealing properties such as heat seal strength, side welding (cut-sealability), hot tack properties (hot-sealability) and sealability with other materials, antistatic property, slipping character, low dusting characteristics and resistance to curling, as well as light-shielding ability to shield light completely.

Heretofore, various proposals have been made for satisfying the above properties.

The inventor has conducted investigations for improving the packaging materials for photosensitive materials, and for example, he has disclosed a packaging material wherein the physical strength is improved by combining two uniaxially stretched films (U.S. Pat. No. 4,331,725). The inventor has also disclosed a laminated film, composed of a foamed sheet and two uniaxially molecularly oriented thermoplastic resin films adhered on the both sides of the foamed sheet by melt adhesion directly or through an extrusion laminating adhesive layer so that respective molecular orientation axes cross each other at an angle of more than 30 degrees, of which the thickness is reduced to 40 to 85% of the total thickness by pressing (U.S. Pat. No. 4,565,733). The laminated film has a great impact puncture strength and Gelbo test strength, and it is excellent as a packaging material for heavy products.

However, the packaging material disclosed in U.S. Pat. No. 4,331,725 was inferior in heat sealing properties and was liable to be broken due to insufficient impact puncture strength and Gelbo test strength. The packaging material disclosed U.S. Pat. No. 4,565,733 was thick, and insufficient in antistatic properties as the packaging material for high-sensitive photographic photosensitive materials. It was also inferior in heat sealing properties in view of securing light-shielding, moistureproofness and the like and in bag-making ability for automatic bag-making machine, and it was expensive. In both packaging materials, trimming loss was also a problem in the lamination.

Therefore, the inventor has conducted an investigation to develop a light-shielding thick packaging material which is coextruded multilayer inflation film using L-LDPE resin blended with carbon black which is excellent in heat sealing properties, tear strength and impact puncture strength. The packaging material has a great physical strength and is only slightly curled. However, when the thickness was more than 120 μm, melt fracture occurred.

SUMMARY OF THE INVENTION

An object of the invention is to provide a packaging material, having high physical strength and little curling, without melt fracture in spite of being thick.

Another object of the invention is to provide a packaging material wherein, lump generation, fish eyes and blocking do not occur, and the dispersibility of light shielding material, Young's modulus and tensile strength and film moldability are improved, as well as impact puncture strength, tear strength and heat sealing properties are secured.

The present invention provides a packaging material for photosensitive materials which achieves such an object, which comprises a coextruded multilayer film having a thickness of more than 120 μm and comprising a linear low density polyethylene resin film layer containing more than 50 wt. % of linear low density polyethylene resin having a density of less than 0.925 g/cm$^3$ and a melt index (MI) of 1.0 to 7.0 g/10 minutes allocated as one surface layer and a polyethylene resin film layer containing more than 5 wt. % of polyethylene resin having a density of more than 0.930 g/cm$^3$ and a melt index of more than 0.5 g/10 minutes allocated as the other surface layer, and containing a light-shielding material in either or both of the above layers.

The present invention also provides a packaging material for photosensitive materials achieved such an object, which comprises a light-shielding linear low density polyethylene resin film layer comprising 50 to 95 wt. % of a first linear low density polyethylene resin having a density of 0.870 to 0.925 g/cm$^3$, a melt index of 0.5 to 7.0 g/10 minutes and a Vicat softening point of lower than 105° C., 5 to 50 wt. % of a second linear low density polyethylene resin having a density of 0.926 to 0.950 g/cm$^3$, a melt index of 0.5 to 7.0 g/10 minutes and a Vicat softening point of higher than 106° C., 0.1 to 15 wt. % of a light-shielding material and 0.01 to 2 wt. % of an antioxidant.

DETAILED DESCRIPTION OF THE INVENTION

The linear low density polyethylene (L-LDPE) resin is a low cost high strength resin, having the advantages of low, medium and high-density polyethylene resin, which meets the requirements, i.e. resource conservation and energy conservation, of the times. The L-LDPE resin is a copolymer of ethylene and α-olefin, and it has a linear structure having short branches. The number of carbon atoms of the α-olefin is 3 to 13. Preferable α-olefins have a number of carbon atoms of 4 to 8, and examples of the α-olefin are butene-1, 4-methylpentene-1, hexene 1, heptene-1 and octene-1. The density is usually in the range of 0.87 to 0.95 g/cm$^3$. Most of the L-LDPE resin is synthesized by a low pressure method, and partly synthesized by a modified high pressure method. Examples of commercial L-LDPE resin are "G-Resin" "TUFLIN" and "NUC-FLEX"

(UCC), "NUC Polyethylene-LL" and "TUFTHENE" (Nippon Unicar) "Excelene V" (Sumitomo Chemical), "Idemitsu Polyethylene-L" and "Moretec" (Idemitsu Petrochemical), "Dowlex" (Dow Chemical), "Suclear" (DuPont de Nemour, Canada), "Marlex" (Phillips), "Neozex" and "Ultzex" (Mitsui Petrochemical Industries), "Nisseki Linirex" (Nippon Petrochemicals), "Stamilex" (DSM), and the like.

The density (JIS K-6760, ASTM D-1505)of the L-LDPE resin of the L-LDPE resin film layer is less than 0.925 g/cm$^3$, preferably 0.880 to 0.925 g/cm$^3$. When the density is beyond 0.925 g/cm$^3$, molecular orientation is liable to occur in the longitudinal direction. Heat sealing properties, film moldability, physical strength, flexibility and low temperature resistance are degraded. The MI (JIS K-6760, ASTM D-1238) is 1.0 to 7.0 g/10 minutes. When the MI is less than 1.0 g/10 minutes, melt fracture occurs due to the insufficient fluidity of the resin. While, when the MI is beyond 7 g/10 minutes, physical strength is degraded. The L-LDPE resin content of the L-LDPE resin film layer is more than 50 wt. %W, preferably 50 to 97 wt. %. When the content is less than 50 wt. %, physical strength and heat sealing properties are inferior.

The polyethylene resin of the polyethylene resin film layers prevents the occurrence of melt fracture by decreasing the viscosity of the molten resin, and prevents draw down at the time of extrusion by increasing the crystallization rate. Besides, the polyethylene resin improves the slipping character of the film, and prevents blocking. The density (ASTM D-1505) of the L-LDPE resin of the L-LDPE resin film layer is more than 0.930 g/cm$^3$, preferably 0.930 to 0.965 g/cm$^3$. When the density is less than 0.930 g/cm$^3$, the crystallization rate is insufficient. The MI(JIS K-6760, ASTM D-1238) is more than 0.5 g/10 minutes, preferably 0.5 to 7 g/10 minutes. When the MI is less than 0.5 g/10 minutes, it is insufficient to prevent the occurrence of blocking. Since molecular orientation occurs in the longitudinal direction, tear strength is insufficient. Moreover, rigidity is great, and lump generation troubles and fish eye problems occur. The polyethylene resin content of the polyethylene resin film layer is more than 5 wt. %, preferably 5 to 50 wt. %, more preferably 10 to 35 wt. %. When the content is less than 5 wt. %, the improvement in film moldability and in Young's modulus is insufficient.

The L-LDPE resin film layer and the polyethylene resin film layer may contain other resins, such as polypropylene resin, ethylene copolymer resins such as EVA resin, EEA resin, EAA resin and EMA resin, modified polyolefin resins, various polyethylene resins, chlorinated polyolefin resins, propylene-α-olefin copolymer resin, polystyrene resin and polyamide resin. In the case of the polyethylene resin film layer, to incorporate L-LDPE resin is preferred. A suitable content of the L-LDPE resin is 5 to 95 wt. %, preferably 20 to 85 wt. %.

The thickness of the coextruded multilayer film is more than 120 μm, preferably 120 μm to 250 μm in order to secure light-shielding and physical strength. The coextruded multilayer film may be composed of the L-LDPE resin film layer and the polyethylene resin film layer alone, or one or more intermediate layer may be incorporated between them.

The coextruded multilayer film may be formed by the inflation process or T-die process. In this case, either of the L-LDPE resin film layer or the polyethylene resin film layer may be positioned as the outer surface layer of the inflation film. When the L-LDPE resin film layer is positioned as the outer surface layer, i.e. the polyethylene resin film layer is positioned as the inner surface layer, blocking does not occur. While, when the L-LDPE resin film layer is positioned as the inner surface layer, pseudo adhesion between the inner surface layers faced with each other easily occurs.

In the packaging material comprising the light-shielding L-LDPE resin film layer, a first L-LDPE resin excellent in impact puncture strength, tear strength, heat sealing properties and dispersibility of light-shielding material is combined with a second L-LDPE resin excellent in antiblocking property and tensile strength.

The density (ASTM D-1505) of the first L-LDPE resin is 0.870 to 0.925 g/cm$^3$. When the density is less than 0.870 g/cm$^3$, polymerizability is inferior, and blocking is liable to occur. While, when the density is beyond 0.925 g/cm$^3$, impact puncture strength and tear strength are insufficient. As a result, it is difficult to achieve the object of the invention by the resin composition incorporating the second L-LDPE resin. The MI (JIS K-6760, ASTM D-1238) is 0.5 to 7 g/10 minutes. When the MI is less than 0.5 g/10 minutes, motor load is great, and melt fracture is liable to occur. While, when the MI is beyond 7 g/10 minutes, draw down occurs, and the inflation bubble is unstable. The Vicat softening point (ASTM D-1525) is lower than 105° C. When the Vicat softening point is beyond 105° C., sealability, flexibility and resistance in low temperature and impact puncture strength are inferior. Preferable first L-LDPE resins are copolymers of ethylene and α-olefin having a number of carbon atoms of more than 6 and very low density L-LDPE resins which one copolymers of ethylene and butene-1 having a density of less than 0.910 g/cm$^3$. The first L-LDPE resin content of the light-shielding L-LDPE resin film layer is 50 to 95 wt. %, preferably 65 to 90 wt. %. When the content is less than 50 wt. %, impact puncture strength, tear strength, low temperature flexibility, low temperature sealability and light shielding material receptivity are inferior.

The density (ASTM D-1505 of the second L-LDPE resin is 0.926 to 0.950 g/cm$^3$. When the density is less than 0.926 g/cm$^3$, Young's modulus and tensile strength are insufficient. As a result, when a heavy material is packaged, light-shielding, moistureproofness and gas barrier are liable to be degraded because of elongation of the film. While, when the density is beyond 0.950 g/cm$^3$, polymerizability is inferior. Molecular orientation occurs in longitudinal direction, and the balance of physical strength between the longitudinal direction and the lateral direction is degraded. Moreover, lump generation troubles and fish eye troubles also occur. The MI (JIS K-6760, ASTM D-1238) is 0.5 to 7 g/10 minutes. When the MI is less than 0.5 g/$^{10}$ minutes, motor load is great, and melt fracture is liable to occur. While, when the MI is beyond 7 g/10 minutes, draw down occurs, and the inflation bubble is unstable. The Vicat softening point is higher than 106° C. When the Vicat softening point is less than 106° C., the blocking, low Young's modulus and low tensile strength being the defects of the first L-LDPE resin cannot be improved. The second L-LDPE resin content of the light-shielding L-LDPE resin film layer is 5 to 50 wt. %, preferably 10 to 40 wt. %. When the content is less than 5 wt. %, the defects of the first L-LDPE resin cannot be improved. While, when the content is beyond 50 wt. %, molecular orientation occurs, and the balance of physical strength between the longitudinal direction and the lateral direction is degraded. Moreover, lump generation troubles and fish eye troubles also occur.

In order to secure light shielding, a light-shielding material is added to at least one of the L-LDPE resin film layer and the polyethylene resin film layer of the coextruded multilayer film, as well as the light-shielding L-LDPE resin film layer.

The light-shielding material is blendable or dispersible in each layer and is capable of shielding visible and ultraviolet light. The shape may be particles, spheres, rods, scales, plates or the like. Examples of the light-shielding material are various carbon blacks, graphite, iron oxide, zinc white, titanium dioxide, clay, aluminum powder, aluminum paste, aluminum short fiber, calcium carbonate, mica, barium sulfate, talc, cadmium pigments, red iron oxide, cobalt blue, copper-phthalocyanine pigments, monoazo and polyazo pigments and aniline blacks. Various carbon blacks, aluminum powder and aluminum paste from which volatile components are removed are preferred in view of quality, cost, light-shielding ability and the like.

Carbon black is the most preferable in view of the improvement in antistatic property, physical strength, antioxidizing ability, light-shielding ability, heat sealing properties, antiblocking ability, securing of photographic properties of the packaged products, and the like. Carbon blacks are divided into gas black, oil black, lamp black, vegetable black and animal black according to their origin. Among these, oil furnace carbon black having a mean particle size of less than 200 m $\mu$, particularly less than 50 m$\mu$ is preferred in terms of light shielding character, cost, blendability and dispersibility. On the other hand, since acetylene black, Ketschen carbon black and graphite have antistatic characteristics, they are also preferred, though they are expensive. They may be blended with the oil furnace carbon black in order to improve its character. A suitable pH of the carbon black is from 5 to 9, and a suitable mean particle size is from 10 to 200 m$\mu$. The oil furnace carbon black having a pH 6 to 9 and a mean particle size of less than 50 m$\mu$ is preferred. By using the carbon black of such pH and particle size, a packaging material having the following merits is obtained. That is, the occurrence of fogging is rare, an increase or decrease of photosensitivity rarely happens, light-shielding ability is great, the lumps of carbon black and pinholes such a fish eyes hardly occur, and the physical strength and heat sealing properties are improved. There are various methods for blending a light-shielding material, the masterbatch is preferable in view of cost, not staining the working place, etc.

As the preferable light-shielding material, metal powder is in second place. Metal powder is a light-reflective light shielding material. It imparts silver appearance which is preferable, and it is excellent in moistureproofness, light-shielding, antistatic property, thermal shielding in the sunlight and gas barrier. As the metal powder, aluminum powder and its paste are preferable. The paste of aluminum powder is produced by adding mineral spirits and a small amount of a higher fatty acid such as stearic acid or oleic acid to form paste at the production of aluminum powder according to a known method such as by using a ball mill, a stamp mill or an atomizer. A polyolefin thermoplastic resin, such as various polypropylene resins, various polyethylene resins, ionomer resins, EVA resin, EEA resin and EAA resin, etc. is kneaded together with this aluminum paste under heating, and volatile components mainly mineral spirits are removed by a vacuum pump. This product is used as aluminum paste compound resin or aluminum paste masterbatch resin. The aluminum paste masterbatch resin is preferable because of eliminating noxious odors and adverse influences upon the photographic photosensitive materials. In order to eliminate noxious odors and adverse influences upon the photographic photosensitive materials, the content of mineral spirits should be less than 0.1 wt. %. When the aluminum paste content is made 2 wt. % by using a masterbatch resin containing 40 wt. % of aluminum paste and 1.0 wt. % of mineral spirits, one part by weight of the masterbatch resin is blended with 19 parts by weight of the main resin. Since a part of the mineral spirits evaporates during molding, the final content of the mineral spirits is less than 0.05 wt. %. The aluminum powder includes microflakes produced from aluminum foil which is crushed by a ball mill or a stamp mill, in addition to conventional aluminum powder manufactured by atomization, dropping on a rotary disc or evaporation from melted aluminum. Since aluminum powder is unstable, it is stabilized by a known treatment. For example, the surface of aluminum powder is treated with a coupling agent or coated with a metal salt of a higher fatty acid.

A suitable content of the light-shielding material is 1 to 15 wt. %. When the content is less than 0.1 wt. %, the blending effect of the light-shielding material, such as to secure light-shielding and to prevent static electrification, cannot be expected. While, when the content is beyond 15 wt. %, the physical strength, particularly the tear strength and impact puncture strength of the polyethylene resin film layer decreases, and heat sealing properties are inferior. Moreover, the photosensitive materials packaged therein is contaminated by the light-shielding material released from the surface of the film. Two or more light-shielding materials may be combined. In any event, it is preferable to contain 0.5 to 50 g of the light-shielding material having a mean particle size of less than 200 m$\mu$ per 1 $m^2$ of the packaging material.

To add an antioxidant is preferred for preventing the degradation of the film by the high temperatures encountered in manufacturing process and during storage.

Suitable antioxidants are phenol antioxidants, sulfur-containing antioxidants, phosphorus-containing antioxidants and the like. The phenol antioxidants include n-octadecyl-3-(3',5'-di-t-butyl-4'-hydroxyphenyl), propionate, 2,6-di-t-butyl-4-methylphenol, 2,6-di t-butyl-p-cresol (BHT), 2,2'-methylenebis(4-methyl-6-t-butylphenol), 4,4'-thiobis(3-methyl-6-t-butylphenol), 4,4'-butylidenebis(3-methyl-6-t-butylphenol), stearyl-$\beta$-(3,5-di-4-butyl-4-hydroxyphenyl) propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene, octadecyl-3-(3,5-di-t-buyl-4-hydroxyphenyl) propionate and tetrakis methylene-3(3',5'-di-t-butyl-4'-hydroxyphenyl)propionate methane. The sulfur-containing oxidation inhibitors include dilauryl-3,3'-thiodipropionate, dimyristyl-3,3'-thiodipropionate, laurylstearylthiodipropionate, distearyl-3,3'-thiodipropionate and ditridecyl-3,3'-thiodipropionate. The phosphorus-containing antioxidants include trinonylphenylphosphite and triphenylphosphite. Particularly effective antioxidants are BHT, low volatile high molecular weight phenol antioxidants ("Irganox 1010", "Irganox 1076", trade names of Ciba-Geigy A. G., "Topanol CA", trade name of I.C.I., etc.), dilaurylthiodipropionate, distearylthiodipropionate, dialkylphosphate, etc. Particularly preferable antioxidants are phenol antioxidants. Two or more antioxidants may be combined. A suitable content of the antioxidant is in the range not adversly affecting photosensitive materials, i.e. 0.001 to 2 wt. %, irrespective of the case of a single antioxidant or the case of a combination of two or more antioxidants. When the content is less than 0.001 wt. %, the blending effect hardly appears. While, when the content is beyond 2 wt. %, a photographic film utilizing oxidation-reduction reaction is adversely influenced by antioxidant. In order to avoid the adverse influence, the content of antioxidant is a minimum amount capable of preventing coloring troubles and the generation of lumps. When an antioxidant is combined with carbon black, an oxidation inhibition effect synergistically occurs.

To add a lubricant to each layer is preferred in order to improve resin fluidity, product insertion, handling and processibility.

The lubricant includes:

Oleic acid amide lubricants; "ARMOSLIP-CP" (Lion Akzo Co., Ltd.), "NEWTRON" and "NEWTRON E-18" (Nippon Fine Chemical Co., Ltd.), "AMIDE-0" (Nitto Kagaku K. K.), "DIAMID O-200" and "DIAMID G-200" (Nippon Kasei Chemical Co., Ltd.), "ALFLOW E-10" (Nippon Oil and Fats Co., Ltd.), etc.

Erucic acid amide lubricants; "ALFLOW P-10" (Nippon Oil and Fats Co., Ltd.), "NEWTRON S" (Nippon Fine Chemical Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical co., Ltd.), etc.

Bis fatty acid amide lubricants; "BISAMIDE" (Nitto Kagaku K. K.), "DIAMID-200 BIS" (Nippon Kasei Chemical Co., Ltd.), "ARMOWAX-EBS" (Lion Akzo Co., Ltd.), etc.

Silicone lubricants; Dimethylpolysiloxanes, etc. (Shinetsu Chemical Co., Ltd., Toray Silicone Co., Ltd.), etc.

Alkylamine lubricants; "ELECTROSTRIPPER TS-2, ELECTROSTRIPPER TS-3" (Kao Corp.), etc.

Preferable lubricants include the fatty acid amide lubricants having a number of carbon atoms of 8 to 50, preferably 15 to 35. Two or more lubricants may be combined.

A suitable content of the total amount of the aforementioned lubricant is 0.01 to 5 wt. %. When the content is less than 0.01 wt. %, the blending effect is insufficient. While, when the content is beyond 5 wt. %, slippage of the screw of the extruder is a problem, and it is difficult to mold a film having an uniform thickness. Moreover, bleeding out occurs resulting in developing troubles by the adhesion of the lubricant to the photosensitive layer, when the packaging material is used for photographic photosensitive materials. In the case of a packaging material for photographic photosensitive materials, a suitable content of the above fatty acid amide lubricant is 0.01 to 1 wt. %. However, a metal salt of fatty acid may be added up to about 5 wt. %.

In order to prevent the blocking of the light-shielding L-LDPE resin film layer, an antiblocking agent may be blended. The antiblocking agent includes silica, calcium silicate, aluminum silicate, talc (magnesium silicate), calcium carbonate, dicarboxylic acid ester amides, and the like. A preferable antiblocking agent is silica, and the silica having a mean particle size of 0.3 to 20 $\mu m$ is particularly preferred. When the mean particle size is less than 0.3 $\mu m$, agglomeration strongly occurs and results in lump generation. Antiblocking effect is insufficient. While, when the mean particle size is beyond 20 $\mu m$, the film surface becomes rough, and scratches the surface of the photosensitive materials. A suitable content of the antiblocking agent is 0.01 to 5 wt. %. When the content is less than 0.01 wt. %, the antiblocking effect is insufficient. While, when the content is beyond 5 wt. %, physical strength and heat sealing properties of the film are degraded, as well as lumps are liable to be generated.

Various additives may be added to each film layer of the invention. Examples of the additives are described below.

(1) Plasticizer; phthalic acid esters, glycol ester, fatty acid ester, phosphoric acid ester, etc.
(2) Stabilizer; lead compounds, cadmium compounds, zinc compounds, alkaline earth metal compounds, organic tin compounds, etc.
(3) Antistatic agent; cationic surfactants, anionic surfactants, nonionic surfactans, ampholytic surfactans, various carbon blacks, metal powder, graphite, etc.
(4) Flame retardant; phosphoric acid esters phosphoric acid ester, halides, halides, inorganic materials, polyols containing phosphorus, etc.
Filler; alumina, kaolin, clay, calcium carbonate, mica, talc, titanium dioxide, silica, etc.
(6) Reinforcing agent: glass lobing, metallic fiber, glass fiber, glass milled fiber, carbon fiber, etc.
(7) Coloring agent; inorganic pigments (Al, $Fe_2O_3$, $TiO_2$, ZnO, Cds, etc.), organic pigments (carbon black, dyes, etc.)
(8) Blowing agent; inorganic blowing agents (ammonium carbonate, sodium hydrogen carbonate), organic blowing agents (nitroso compounds, azo compounds), etc.
(9) Vulcanizing agent; vulcanization accelerator, acceleration assistant, etc.
(10) Deterioration preventing agent; ultraviolet absorber, antioxidant, metal deactivator, peroxide decomposing agent, etc.
(11) Coupling agent; silane compounds, titanium compounds, chromium compounds, aluminum compounds, etc.
(12) Various thermoplastic resins, deodorants, perfumes, moisture absorbents, rubbers, etc.

The packaging material comprising the light-shielding L-LDPE resin film layer may be a single layer film composed of the light-shielding L-LDPE resin film layer alone, or a coextruded multilayer film composed of plural light-shielding L-LDPE resin film layers of the invention or a light-shielding L-LDPE resin film layer of the invention and other layer(s). Moreover, other flexible sheet(s) may be laminated thereon. The flexible sheet capable of being laminating on the extruded light-shielding film includes various thermoplastic resin films such as various polyethylene resin films, ethylene copolymer resin films, polypropylene resin films, polyvinyl chloride resin films, polyvinylidene chloride resin films, polyamide resin films, polycarbonate resin films, polyester resin films and their modified resin films. Other flexible sheets such as a metallized film such as aluminum-metallized film, cellulose acetate film, cellophane, polyvinyl alcohol film, paper, metal foil such as aluminum foil and nonwoven fabric, are also suitable.

Preferable flexible sheets are various papers having an areal weight of 20 to 400 g/m² such as unbleached kraft paper, semibleached kraft paper, bleached kraft paper, neutral kraft paper, twisting paper, bleached sulfite paper, Clupak paper, Duostress paper, white cardboard, wood-free paper, photo base paper, pure white roll paper, simili and glassine paper, metal foils 5 to 50 μm in thickness such as aluminum foil, zinc foil, lead foil and iron foil, aluminum-metallized paper, metallized films such as aluminum-metallized thermoplastic resin films, and the like.

The packaging material of the invention may be used for packaging photosensitive materials such as photographic photosensitive materials, foods, medicines or chemical substances, and it is particularly suitable for packaging silver halide photographic photosensitive materials, diazo photographic photosensitive materials, photosensitive resins, self-developing type photographic photosensitive materials, photosensitive heat-sensitive materials, direct positive color photosensitive materials, diffusion transfer type photographic photosensitive materials and other photographic materials which are degraded by small amounts of light, moisture or gas.

Package form may be conventional, and includes a single-sheet flat bag, a double-sheet flat bag, a self-standing bag, a single-sheet gusset bag, a double-sheet gusset bag, inner lining for a moistureproof box, inner lining for a light room-loading light-shielding box and a leader paper etc. The packaging material of a coextruded multilayer film (inflation film, T die film) comprising the L-LDPE resin film layer and the polyethylene resin film layer is effective for packaging a bulk roll or assembly packaging of a photographic photosensitive material, utilizing the cylindrical shape of the inflation film, and packaging workability can be increased. The sealing form may also be conventional, and includes heat sealing, side welding, impulse heat sealing, ultrasonic sealing, hot-air welding and high frequency sealing etc. The methods of using an adhesive may also be utilized.

In the packaging material of a coextruded multilayer film comprising the L-LDPE resin film layer and the polyethylene resin film layer, since melt fracture does not occur in spite of being a thick film, the film surface is smooth. Blocking does not occur, and the dispersibility of carbon black and the like being a light-shielding material is excellent. The coextruded multilayer film is excellent in film moldability, flexibility, antiblocking property physical strength such as tear strength and impact puncture strength, heat sealing properties, resistance to curling, and inexpensiveness.

In the packaging material of the light-shielding L-LDPE resin film layer, the first L-LDPE resin increases impact strength and tear strength, and improves heat sealing properties and the dispersibility of light-shielding material. The second L-LDPE resin improves antiblocking property, and increases tensile strength. The light-shielding material improves the physical strength of the L-LDPE resin film layer, as well as imparts light-shielding. The antioxidant prevents the generation of lumps, fish eyes and coloring troubles. The packaging material of the invention is excellent in all physical strengths, particularly in tear strength and impact puncture strength, and antiblocking property. The amount of static electrification is small, and the generation of lumps and fish eyes are rare. The packaging material is excellent in the dispersibility of light-shielding material, film moldability, heat sealing properties, elapsed heat seal strength and bag-making ability.

Representative embodiments of the packaging material of a coextruded multiplayer film of the invention are illustrated in FIGS. 1 to 9.

Figure 1:
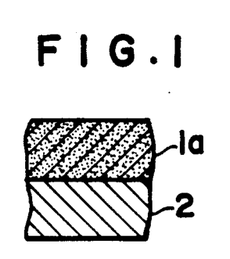
FIGS. 1 to 9 are partial sectional views of the packaging materials for photosensitive materials embodying the invention.

The packaging material of FIG. 1 is a light-shielding coextruded multilayer film consisting of the polyethylene resin film layer 1a containing a light-shielding material and the L-LDPE resin film layer 2.

Figure 2:
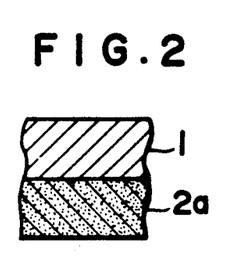

The packaging material of FIG. 2 is a light-shielding coextruded multilayer film consisting of the polyethylene resin film layer 1 and the L-LDPE resin film layer 2a containing a light-shielding material, respectively.

Figure 3:
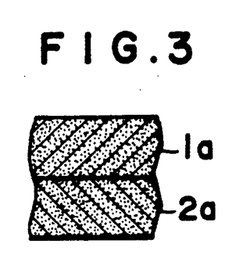
Figure 4:
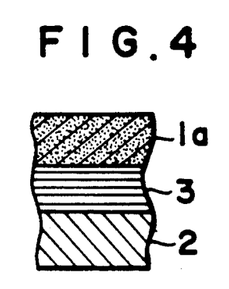

The packaging material of FIG. 3 is a light-shielding coextruded multilayer film consisting of the polyethylene resin film layer 1a and the L-LDPE resin film layer 2a containing alight-sensitive material, respectively.

the packaging material of FIG. 4 is a light-shielding coextruded multilayer film consisting of the polyethylene resin film layer 1a containing a light-shielding material, an intermediate layer 3 and the L-LDPE resin film layer 2, arranged in this order.

Figure 5:
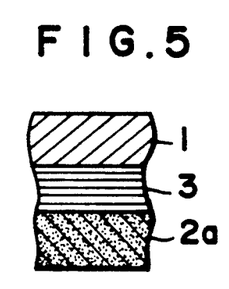

The packaging material of FIG. 5 is a light-shielding coextruded multilayer film consisting of the polyethylene resin film layer 1, an intermediate layer 3 and the L-LDPE resin film layer 2a containing a light-shielding material, arranged in this order.

Figure 6:
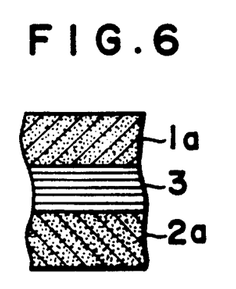

The packaging material of FIG. 6 is a light-shielding coextruded multilayer film consisting of the polyethylene resin film layer 1a containing a light-shielding material, an intermediate layer 3 and the L-LDPE resin film layer 2a containing a light-shielding material, arranged in this order.

Figure 7:
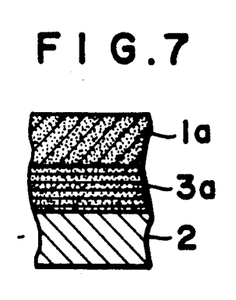

The packaging material of FIG. 7 is a light-shielding coextruded multilayer film consisting of the polyethylene resin film layer 1a containing a light-shielding material, an intermediate layer 3a containing a light-shielding material and the L-LDPE resin film layer 2, arranged in this order.

Figure 8:
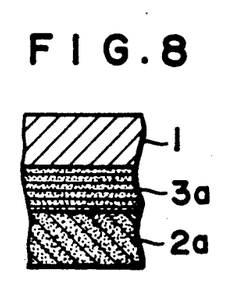

The packaging material of FIG. 8 is a light-shielding coextruded multilayer film consisting of the polyethylene resin film 1, an intermediate layer 3a containing a light-shielding material and the L-LDPE resin film layer 2a containing a light-shielding material, arranged in this order.

Figure 9:
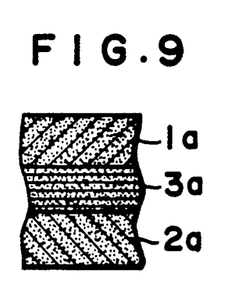

The packaging material of FIG. 9 is a light-shielding coextruded multilayer film consisting of the polyethylene resin film layer 1a, an intermediate layer 3a and the L-LDPE resin film layer 2a, all layer containing a light-shielding material.

Figure 10:
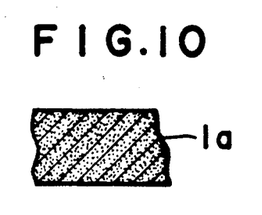
FIGS. 10 and 11 are partial sectional views of comparative packaging materials.

The packaging material of FIG. 10 is a comparative packaging material consisting of a single layer of the polyethylene resin film layer 1a containing a light-shielding material, alone.

The packaging material of FIG. 10 is a comparative packaging material consisting of a single layer of the L-LDPE resin film layer 2a containing a light-shielding material, alone.

Representative embodiments of the packaging material of the light-shielding L-LDPE resin film layer containing a first L-LDPE resin and a second L-LDPE resin of the invention are illustrated in FIGS. 12 to 19.

Figure 12:
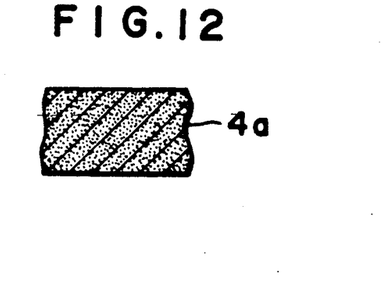
FIGS. 12 to 19 are partial sectional views of the packaging materials for photosensitive materials embodying the invention.

The packaging material of FIG. 12 is a single layer film consisting of the light-shielding L-LDPE resin film layer 4a.

Figure 13:
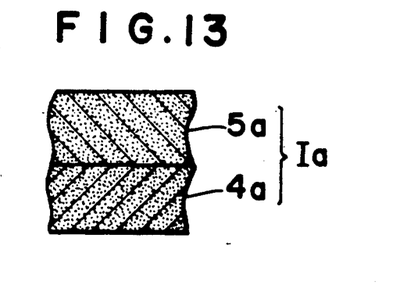

The packaging material of FIG. 13 is a multilayer coextruded light shielding film 1a consisting of the light-shielding L-LDPE resin film layer 4a and a thermoplastic resin film layer 5a containing a light-shielding material.

Figure 14:
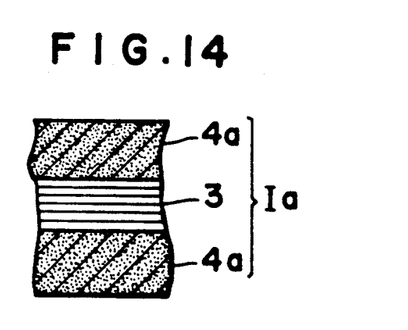

The packaging material of FIG. 14 is a multilayer coextruded light shielding film 1a consisting of two light-shielding L-LDPE resin film layers 4a,4a and an intermediate layer 3 interposed therebetween.

Figure 15:
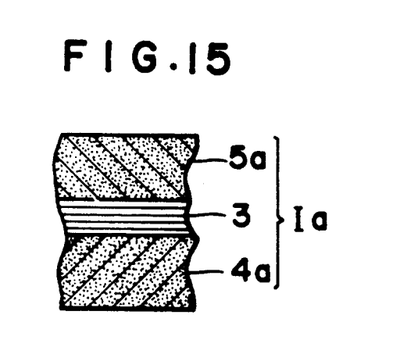

The packaging material of FIG. 15 is a multilayer coextruded light-shielding film 1a consisting of the light-shielding L-LDPE resin film layer 4a, a thermoplastic resin film layer 5a containing a light-shielding material and an intermediate layer 3 interposed therebetween.

Figure 16:
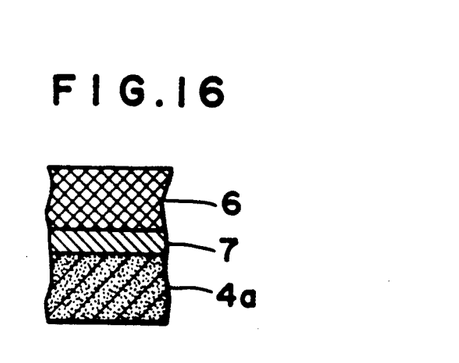

The packaging material of FIG. 16 consists of the light-shielding L-LDPE resin film layer 4a and a flexible sheet layer 6 laminated thereon through an adhesive layer 7.

Figure 17:
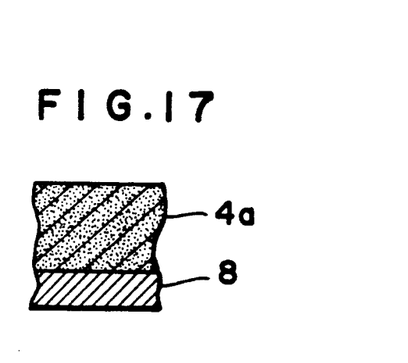

The packaging material of FIG. 17 consists of the light-shielding L-LDPE resin film layer 4a and a heat sealing layer 8 directly laminated thereon.

Figure 18:
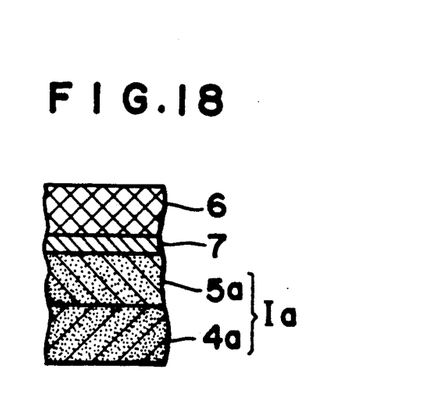

The packaging material of FIG. 18 consists of the multilayer coextruded light-shielding film 1a of FIG. 13 and a flexible sheet layer 6 laminated on the thermoplastic resin film layer 5a side through an adhesive layer 7.

Figure 19:
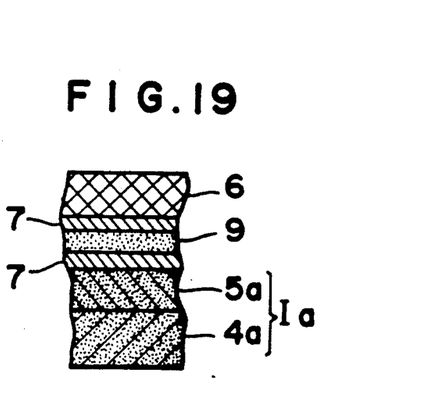

The packaging material of FIG. 19 consists of the multilayer coextruded light shielding film 1a of FIG. 13, a metal foil 9 and a flexible sheet layer 6 laminated in this order each through an adhesive layer 7.

EXAMPLES

The packaging material of Example I corresponds to the packaging material of FIG. 3. The polyethylene resin film layer 1a was 70 μm in thickness composed of 20 wt. % of HDPE resin having a density of 0.954 g/cm$^3$ and a MI of 1.1 g/10 minutes, 76.8 wt. % of L-LDPE resin which is a copolymer of ethylene and 4-methylpentene 1, 3 wt. % of carbon black and 0.2 wt. % of antioxidant. The L-LDPE resin film layer 2a was 70 μm in thickness composed of 95.949 wt. % of L-LDPE resin having a density of 0.920 g/cm$^3$ and a MI of 2.1 g/$^{10}$ minutes, 3.75 wt. % of carbon black, 0.25 wt. % of antioxidant and 0.51 wt. % of oleic acid amide. The light-shielding coextruded multilayer film was formed by an inflation process using a ring die having a lip clearance of 1 mm in a blow up ratio of 1.76. The polyethylene resin film layer 1a was arranged as the inner surface layer, i.e. the L-LDPE resin film layer 2a was arranged as the outer surface layer, and the thickness of the coextruded double layer film was 140 μm. Blocking and melt fracture did not occur, and the molded film was excellent in smoothness and the dispersibility of carbon black.

The packaging material of Example II corresponds to the packaging material of FIG. 3. The light-shielding coextruded multilayer film was the same as the packaging material of Example I, except that the L-LDPE resin in the polyethylene resin film layer 1a was replaced by another L-LDPE resin which is a copolymer of ethylene and 4-methylpentene-1 having a density of 0.915 g/cm$^3$ and a MI of 2.3 g/10 minutes. The coextruded double layer film was excellent in film moldability, and blocking and melt fracture did not occur. The molded film was excellent in smoothness and physical strength.

The packaging material of Example III corresponds to the packaging of FIG. 3. The light shielding coextruded multilayer film was the same as the packaging material of Example I, except that the film was extruded so that the polyethylene resin film layer 1a was arranged as the outer surface layer, i.e. the L-LDPE resin film layer 2a was arranged as the inner surface layer. In this case, blocking occurred in the molded film. However, melt fracture did not occur, and the molded film was excellent in smoothness, physical strength and the dispersibility of carbon black. Since the inner surface layers of the deflated film was adhered to each other by pseudo adhesion, the deflated film had substantially similar or more characteristics compared with the 4 layer laminated film having a thickness of 280 μm, and the manufacturing cost could be sharply reduced.

Figure 11:
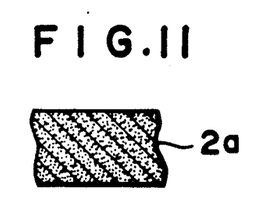

Comparative packaging material I corresponds to the packaging material of FIG. 11. The L-LDPE resin film layer 2a was 140 μm in thickness composed of 96 wt. % of the L-LDPE resin having a density of 0.920 g/cm$^3$ and a MI of 2.1 g/10 minutes, 3.75 wt. % of the carbon black and 0.25 wt. % of the antioxidant used in the L-LDPE resin film layer 2a of Example I. The film was formed by an inflation process using a ring die having a lip clearance of 1 mm in a blow-up ratio of 1.76. In the molded film, melt fracture, as well as blocking occurred. The film was inferior in smoothness, and many lumps generated.

Comparative packaging material II corresponds to the packaging material of FIG. 10. The polyethylene resin film layer 1a was 140 μm in thickness composed of 20 wt. % of LDPE resin having a density of 0.923 g/cm$^3$ and a MI of 2.4 g/10 minutes, 76.8 wt. % of the L-LDPE resin having a density of 0.920 g/cm$^3$ and a MI of 2.1 g/10 minutes, 3 wt. % of the carbon black and 0.2 wt. % of the antioxidant used in the polyethylene resin film layer 1a of Example 1. The film was molded in the same manner as Comparative packaging material I. Similar to Comparative packaging material I, blocking occurred, and wrinkle, longitudinal streaks and draw down occurred to a large extent, resulting in the surface not being smooth.

The packaging material of Example IV corresponds to the packaging material of FIG. 12. The light-shielding L-LDPE resin film layer 4a was 70 μm in thickness composed of 60 wt. % of a first L-LDPE resin being a copolymer of ethylene and 4-methylpentene 1 having a density of 0.920 g/cm$^3$, a MI of 2.0 g/10 minutes and a Vicat softening point of 93° C. ("ULTZEX" Mitsui Petrochemical Industries), 36.8 wt. % of a second L-LDPE resin being a copolymer of ethylene and 4-methylpentene-1 having a density of 0.940 g/cm$^3$, a MI of 2.1 g/10 minutes and a Vicat softening point of 115° C. ("ULTZEX", Mitsui Petrochemical Industries), 3 wt. % of oil furnace carbon black having a mean particle size of 21 mμ and a pH of 7.7 ("#44B", Mitsubishi Chemical Industries), 0.05 wt. % of stearyl-β-(3,5-di-4-hydroxyphenyl)propionate and 0.15 wt. % of tetrakis[-methylene-3-(3',5'-di-t-butyl-4'-hydroxyphenyl)propionate] methane. The film was formed by inflation process using a ring die having a lip clearance of 1 mm in a blow up ratio of 1.76.

The packaging material of Example V was the same as the packaging material of Example IV, except that the content of the first L-LDPE resin and the content of the second L-LDPE resin were inverted.

The packaging material of Example VI was the same as the packaging material of Example IV, except that the first L-LDPE resin was a copolymer of ethylene and 4-methylpentene-1 having a density of 0.920 g/cm$^3$, a MI of 2.3 g/10 minutes and a Vicat softening point of 97° C. ("ULTZEX", Mitsui Petrochemical Industries), and the second L-LDPE resin was a copolymer of ethylene and 4-methylpentene-1 having a density of 0.935 g/cm³, a MI of 2.1 g/10 minutes and a Vicat softening point of 113° C. ("ULTZEX", Mitsui Petrochemical Industries).

The packaging material of Example VII was the same as the packaging material of Example IV, except that the first L-LDPE resin was a copolymer of ethylene and 4-methylpentene-1 having a density of 0.920 g/cm³, a MI of 2.1 g/10 minutes and a Vicat softening point of 100° C. ("ULTZEX", Mitsui Petrochemical Industries), and the second L-LDPE resin was a copolymer of ethylene and 4-methylpentene-1 having a density of 0.930 g/cm³, a MI of 2.1 g/10 minutes and a Vicat softening points of 109° C. ("ULTZEX", Mitsui Petrochemical Industries).

Comparative packaging material III was the same as the packaging material of Example IV, except that 96.8 wt. % of the same second L-LDPE resin as Example IV was used instead of blending the first L-LDPE resin.

Comparative packaging material IV was the same as the packaging material of Example IV, except that the first L-LDPE resin and the second L-LDPE resin was replaced by 96.8 wt. % of the second L-LDPE resin of Example VII.

Comparative packaging material V was the same as the packaging material of Example IV, except that 96.8 wt. % of the same first L-LDPE as Example IV was used instead of blending the second L-LDPE resin.

Conventional packaging material 1 was 70 μm in thickness composed 97 wt. % of LDPE resin having a density of 0.923 g/cm³, a MI of 2.4 g/10 minutes and a Vicat softening point of 93° C. and 3 wt. % of carbon black. The film-forming process was the same as Example IV.

Various properties of the above packaging materials were measured, and the results are shown in Table 1.

| Impact Puncture Strength: | JIS P-8134 |

Antiblocking Property: Each wound inflation film was cut in a size of 330 mm (lay-flat width)×220 mm by a razor, and the antiblocking property was judged through opening of the cut portion.

Frictional Electrification: An endless belt of each exemplified packaging material having 35 mm in width and 1350 mm in length was prepared, and this belt was run between two SUS rollers loaded with 500 g at a speed of 12 m/min. The frictional electrification was measured by a voltmeter.

Film Moldability: Judged by motor load (electric current value), bubble stability, the position of frosting line, fish eyes, lumps, wrinkling and the uniformity in film thickness collectively.

Dispersibility of Carbon Black: Judged by the light-shielding ability, the generation degrees of fish eyes and lumps of each exemplified packaging material.

Bag-Making Ability: Judged by the difference of melting points between the inner surface layer and the outer surface layer, low temperature heat sealing properties, heat seal strength, hot tack properties, sealability with other materials, elapsed heat seal strength, curling, the generation of pinholes, and bag ruptures during transportation of products, collectively.

I claim:

1. A packaging material for photosensitive materials, which comprises a coextruded multilayer film having a thickness of more than 120 μm and comprising a linear low density polyethylene resin film layer containing more than 50 wt. % of linear low density polyethylene having a density of less than 0.925 g/cm³ and a melt index of 1.0 to 7.0 g/10 minutes allocated as one surface

TABLE 1

|  | Unit | Invention | | | | Comparative | | | Conventional I (LDPE Resin) |
|---|---|---|---|---|---|---|---|---|---|
|  |  | IV | V | VI | VII | III | IV | V |  |
| First L-LDPE Resin |  |  |  |  |  |  |  |  |  |
| Density | g/cm³ | 0.920 | 0.920 | 0.920 | 0.920 | — | — | 0.920 | 0.923 |
| MI | g/10 min. | 2.0 | 2.0 | 2.3 | 2.1 | — | — | 2.0 | 2.4 |
| Vicat Softening Point | °C. | 93 | 93 | 97 | 100 | — | — | 93 | 93 |
| Content | wt. % | 60 | 36.8 | 60 | 60 | — | — | 96.8 | 97 |
| Second L-LDPE Resin |  |  |  |  |  |  |  |  |  |
| Density | g/cm³ | 0.940 | 0.940 | 0.935 | 0.930 | 0.940 | 0.930 | — | — |
| MI | g/10 min. | 2.1 | 2.1 | 2.1 | 2.1 | 2.1 | 2.1 | — | — |
| Vicat Softening Point | °C. | 115 | 115 | 113 | 109 | 115 | 109 | — | — |
| Content | wt. % | 36.8 | 60 | 36.8 | 36.8 | 96.8 | 96.8 | — | — |
| Carbon Black Content | " | 3 | 3 | 3 | 3 | 3 | 3 | 3 | 3 |
| Antioxidant Content | " | 0.2 | 0.2 | 0.2 | 0.2 | 0.2 | 0.2 | 0.2 | — |
| Tear Strength | — | A | B | A | A | D | D | A | E |
| Impact Puncture Strength | — | A | B | A | A | C | C | A | D |
| Antiblocking Property | — | A | A | A | B | A | A | D | C |
| Frictional Electlification | — | B | B | B | B | D | D | B | B |
| Film Moldability | — | B | B | B | B | C | C | C | B |
| Carbon Black Dispersibility | — | B | B | B | B | A | A | C | C |
| Bag-Making Ability | — | A | A | A | A | B | B | A | D |

Evaluations in Table 1 were carried out as follows:

A very excellent
B excellent
C practical
D having a problem
E impractical

| Density: | ASTM D-1505 |
| MI: | ASTM D-1238 = JIS K-6760 |
| Vicat Softening Point: | ASTM D-1525 |
| Tear Strength: | JIS P-8116 | layer and a polyethylene resin film layer containing more than 5 wt. % of polyethylene resin having a density of more than 0.930 g/cm³ and a melt index of more than 0.5 g/10 minutes allocated as the other surface layer, and containing a light-shielding material in either or both of the above layers.

2. The packaging material of claim 1, wherein the polyethylene resin film layer contains 5 to 95 wt. % of linear low density polyethylene resin.

3. The packaging material of claim 1, wherein the coextruded multilayer film essentially consists of said linear low density polyethylene resin film layer and said polyethylene resin film layer.

4. The packaging material of claim 1 of which the linear low density polyethylene resin film layer is allocated as the inner surface layer, and the linear low density polyethylene resin film layer is adhered to each other by pseudo adhesion caused by blocking.

5. A packaging material for photosensitive materials, which comprises a light-shielding linear low density polyethylene resin film layer comprising 50 to 95 wt. % of a first linear low density polyethylene resin having a density of 0.870 to 0.925 g/cm$^3$, a melt index of 0.5 to 7.0 g/10 minutes and a Vicat softening point of lower than 105° C., 4 to 50 wt. % of a second linear low density polyethylene resin having a density of 0.926 to 0.925 g/cm$^3$, a melt index of 0.5 to 7.0 g/10 minutes and a Vicat softening point of higher than 105° C., 0.1 to 15 wt. % of a light-shielding material and 0.01 to 2 wt. % of an antioxidant.

6. The packaging material of claim 5 essentially consists of said light-shielding linear low density polyethylene resin film layer.

* * * * *